United States Patent
Chai et al.

(10) Patent No.: US 10,445,746 B2
(45) Date of Patent: Oct. 15, 2019

(54) METHOD FOR CHECKING COMPLIANCE OF PAYMENT APPLICATION IN VIRTUALIZED ENVIRONMENT

(71) Applicant: CHINA UNIONPAY CO., LTD., Shanghai (CN)

(72) Inventors: Hongfeng Chai, Shanghai (CN); Chengrong Wu, Shanghai (CN); Zhijun Lu, Shanghai (CN); Jie Wu, Shanghai (CN); Dongjie He, Shanghai (CN); Jianping Zeng, Shanghai (CN)

(73) Assignee: CHINA UNIONPAY CO., LTD., Shanghai (CN)

( * ) Notice: Subject to any disclaimer, the term of this patent is extended or adjusted under 35 U.S.C. 154(b) by 772 days.

(21) Appl. No.: 15/030,657

(22) PCT Filed: Oct. 20, 2014

(86) PCT No.: PCT/CN2014/088967
§ 371 (c)(1),
(2) Date: Apr. 20, 2016

(87) PCT Pub. No.: WO2015/058665
PCT Pub. Date: Apr. 30, 2015

(65) Prior Publication Data
US 2016/0283949 A1    Sep. 29, 2016

(30) Foreign Application Priority Data
Oct. 22, 2013    (CN) .......................... 2013 1 0496759

(51) Int. Cl.
*G06K 5/00*    (2006.01)
*G06Q 30/00*    (2012.01)
(Continued)

(52) U.S. Cl.
CPC ....... *G06Q 30/018* (2013.01); *G06F 9/45558* (2013.01); *G06F 21/50* (2013.01);
(Continued)

(58) Field of Classification Search
CPC ...... G06Q 30/018; G06Q 20/10; H04L 43/16; H04L 63/1408; H04L 67/16; H04M 15/48;
(Continued)

(56) References Cited

U.S. PATENT DOCUMENTS 5,982,891 A    11/1999 Ginter et al.
8,387,046 B1    2/2013 Montague
(Continued)

FOREIGN PATENT DOCUMENTS

CA    2212574 A1    9/1996
CN    1183841 A    6/1998
(Continued)

*Primary Examiner* — Karl D Frech
(74) *Attorney, Agent, or Firm* — The Ollila Law Group LLC (57) ABSTRACT

The invention provides a compliance detecting method of payment applications in a virtualized environment, and pertains to the field of security technology of payment applications. The detecting method is used for compliance detection for PCI DSS isolation demands. The detecting method can determine whether it is a compliance state by analyzing the current virtual machine domain and its connection from data stream, and can also determine whether it is a compliance state by analyzing the purity of network flow of virtual machines. The detecting method is suitable for a virtualized environment and makes the detection of compliance accurate in the virtualized environment, thus being advantageous for guaranteeing the security of payment applications.

20 Claims, 3 Drawing Sheets (51) Int. Cl.
  *G06F 21/50* (2013.01)
  *H04L 29/06* (2006.01)
  *G06F 21/53* (2013.01)
  *G06F 9/455* (2018.01)
  *G06Q 20/10* (2012.01)
  *H04L 12/26* (2006.01)
  *H04L 29/08* (2006.01)
  *H04M 15/00* (2006.01)
  *H04M 17/00* (2006.01)

(52) U.S. Cl.
  CPC ............ *G06F 21/53* (2013.01); *G06Q 20/10* (2013.01); *H04L 43/16* (2013.01); *H04L 63/1408* (2013.01); *H04L 67/16* (2013.01); *H04M 15/48* (2013.01); *G06F 2009/45595* (2013.01); *H04M 2017/14* (2013.01)

(58) Field of Classification Search
  CPC ............ H04M 2017/14; G06F 9/45558; G06F 21/50; G06F 21/53; G06F 2009/45595
  USPC .................................................. 235/380, 379
  See application file for complete search history.

(56) References Cited

U.S. PATENT DOCUMENTS

| | | | |
|---|---|---|---|
| 2009/0254990 A1 | 10/2009 | McGee | |
| 2013/0290070 A1* | 10/2013 | Abraham | ........... G06Q 30/0204 705/7.33 |
| 2018/0018723 A1* | 1/2018 | Nagla | ................ G06Q 30/0609 |

FOREIGN PATENT DOCUMENTS

| | | |
|---|---|---|
| CN | 1909488 A | 2/2007 |
| CN | 101848092 A | 9/2010 |
| CN | 102696047 A | 9/2012 |
| CN | 103269367 A | 8/2013 |

* cited by examiner

Fig. 3 ns to the construction of information system of their own. The Security Standard Committee of Payment Card Industry (PCI) points out in a new edition v2.0 of Data Security Standard (DSS) in 2010 that "a system assembly components for evaluating PCI DSS compliance comprises all the virtualized assemblies", and the explicit wording of "virtualization" has also appeared under item 2.2.1. These updates have made it clear that the virtualization technology can be used in a Cardholder Data Environment (CDE). The virtualization board of the committee has also issued a PCI DSS virtualization guideline, which also provides basis for using virtualization technology in the construction of payment applications.

METHOD FOR CHECKING COMPLIANCE OF PAYMENT APPLICATION IN VIRTUALIZED ENVIRONMENT

FIELD OF THE INVENTION

The invention relates to the field of security technology of payment applications, in particular, to compliance detection for PCI DSS isolation demands of payment applications in a virtualized environment.

BACKGROUND

In recent years, the technology of virtualization and cloud computing has received rapid development, and many organizations and enterprises have begun to apply the virtualization technology to the construction of information system of their own. The Security Standard Committee of Payment Card Industry (PCI) points out in a new edition v2.0 of Data Security Standard (DSS) in 2010 that "a system assembly components for evaluating PCI DSS compliance comprises all the virtualized assemblies", and the explicit wording of "virtualization" has also appeared under item 2.2.1. These updates have made it clear that the virtualization technology can be used in a Cardholder Data Environment (CDE). The virtualization board of the committee has also issued a PCI DSS virtualization guideline, which also provides basis for using virtualization technology in the construction of payment applications.

Payment applications provide the cardholder with various means of payment service. Since the transmission content of business data thereof relates to sensitive information such as bank card number and password of the user, etc., the security of payment applications becomes very important for users. In order to reduce the possibility of data leakage as much as possible, the entities such as merchants and bill-to party or the like which execute payment applications must execute a security auditing program of PCI so as to ensure compliance with demands of PCI DSS, i.e., executing compliance detection. According to relevant laws and regulations and industrial standards, the compliance detecting method in a new environment (especially a virtualized environment) is studied so as to help enterprises or entities in finding currently existing non-compliance state timely, thus ensuring the security of payment applications in a virtualized environment and better protecting data security of cardholder.

However, existing compliance detecting methods are mainly designed for conventional information system architectures, and a virtualization assembly is not considered in the system assembly; with the rapid development of virtualization technology, a plurality of virtual machines can be installed on the same one physical machine, which, at the same time of improving utilization of resources, also brings about a new security risk, thus having a corresponding influence on the compliance of PCI DSS. The isolation demand of PCI DSS mainly requires a configuration of firewall and router so as to restrict a connection between a non-trusted network and a system assembly of cardholder data environment. Due to the complexity of virtualized environment, a virtual network connection may exist between host computers or in the interior of host computer so that a communication between virtual machines in a cardholder data environment may not be conducted via the physical network at all; moreover, the boundary between a trust network and a non-trusted network may be varied dynamically. Therefore, the existing compliance detecting methods may be no longer appropriate to a virtualized environment.

SUMMARY OF THE INVENTION

The object of the invention is to provide a compliance detecting method adapted to payment applications for PCI DSS isolation demand in a virtualized environment.

In order to achieve the above object or other objects, the invention provides the following technical solution.

According to an aspect of the invention, a compliance detecting method of payment applications in a virtualized environment is provided, which is used for compliance detection for PCI DSS isolation demand, comprising the following steps:

collecting network flows across physical machines and across virtual machines in a virtualized environment;

performing flow pre-processing for the network flow so as to determine each data stream that correspondingly connects two different virtual machines;

at least determining a virtual machine domain D (VM) to which one payment application corresponds according to all the data streams, and further determining a connection collection C (VMi) of other virtual machines correspondingly connected by each virtual machine VMi among M virtual machines in the virtual machine domain D (VM), wherein M is larger than or equal to 2, $1 \leq i \leq M$;

comparing the virtual machine domain D (VM) of the payment application with a predetermined virtual machine domain D' (VM) corresponding to the payment application, wherein the predetermined virtual machine domain D' (VM) is a collection of virtual machines to which the payment application corresponds in a compliance state;

if D (VM) is equal to D' (VM), determining whether the connection collection C (VMi) of each virtual machine in the virtual machine domain D (VM) is correspondingly equal to a connection collection C'(VMf) of each virtual machine VMf in the predetermined virtual machine domain D'(VM); and if it is determined "yes", a compliance state is determined, wherein f is an integer larger than or equal to 2;

if D (VM) is not equal to D' (VM), or C (VMi) is not equal to C' (VMf), determining that the current virtual machine domain D (VM) is in a non-compliance state.

According to the compliance detecting method of one embodiment of the invention:

after the non-compliance state being determined, further determining a collection $D_{Diff}$(VM) of virtual machines in D (VM) that cannot be correspondingly found in D'(VM), and determining a collection $D_{Diff'}$ (VM) of virtual machines in D' (VM) that cannot be correspondingly found in D(VM);

determining a collection of virtual machines $D_j$ (VM) that is an intersection collection of D (VM) and D' (VM);

determining whether a connection collection $C_{Diff}$ (VM) of each virtual machine in $D_{Diff}$ (VM) and $D_{Diff'}$ (VM) can find a corresponding equal connection collection in the connection collection $C_j$ (VM) of each virtual machine in $D_j$ (VM);

if it is determined "yes", an update is made to determine the non-compliance state as the compliance state.

According to the compliance detecting method of one embodiment of the invention, optionally:

if the connection collection $C_{Diff}$ (VM) of each virtual machine in $D_{Diff}$ (VM) and $D_{Diff'}$ (VM) can not all find a corresponding equal connection collection in the connection collection $C_j$ (VM) of each virtual machine in $D_j$ (VM), removing a virtual machine, that can find a corresponding equal connection collection in the connection collection $C_j$ (VM) of each virtual machine in $D_j$ (VM), from $D_{Diff}$(VM) thus obtaining $D'_{Diff}$(VM); and removing a virtual machine, that can find a corresponding equal connection collection in the connection collection $C_j$ (VM) of each virtual machine in $D_j$ (VM), from $D_{Diff'}$ (VM), thus obtaining $D'_{Diff'}$ (VM);

determining whether the connection collection of each virtual machine in $D_{Diff'}$ (VM) and $D'_{Diff'}$ (VM) can find a corresponding equal connection collection of virtual machines in the predetermined virtual machine domain D' (VM);

if it is determined "yes", an update is made to determine the non-compliance state as the compliance state; otherwise, the non-compliance state is maintained.

Optionally, when collecting network flow across physical machines, a bypass detector is provided at a gateway of a physical network security device which controls communication access across physical machines, so as to perform mirror capture of the network flow across physical machines.

Optionally, when collecting the network flow across physical machines, a detection virtual machine is correspondingly provided in the same one physical machine where a plurality of virtual machines are located, wherein the detection virtual machine uses a virtual network port thereof as a mirror port of other virtual network ports, and collects the network flow across a plurality of virtual machines in this physical machine via this mirror port.

Specifically, at the network flow pre-processing step, data stream in the network flow is extracted with a quintuple <source IP address, source port number, destiny IP address, destiny port number, transmission protocol> as the identifier.

Optionally, each virtual machine in the virtualized environment is determined according to the IP address and the virtual network port number, thus determining each said data stream which connects two different virtual machines.

According to another aspect of the invention, a compliance detecting method of payment applications in a virtualized environment is provided, which is used for compliance detection for PCI DSS isolation demand, comprising the following steps:

collecting network flow across physical machines and across virtual machines in a virtualized environment;

performing flow pre-processing for the network flow so as to determine each data stream which connects two different virtual machines;

identifying the data stream according to application layer load of the data stream so as to determine whether it is payment application flow to which the payment application corresponds;

calculating the percentage of the payment application flow in all the data streams;

determining whether the percentage is smaller than or equal to a predetermined value;

if it is determined "yes", a non-compliance state is determined; and if it is determined "no", a compliance state is determined.

According to the compliance detecting method of one embodiment of the invention, if the application layer load of the data stream matches with load characteristic of the payment application, it is determined that the data stream is payment application flow to which the payment application corresponds.

According to the compliance detecting method of one embodiment of the invention, if the application layer load of the data stream does not match with load characteristic of the payment application, it is determined whether the data stream matches with encrypted data stream characteristic of the payment application; if it is determined "yes", it is determined that the data stream is payment application flow to which the payment application corresponds.

Optionally, before the identifying step, a step of exacting the load characteristic of the payment application is included, wherein the load characteristic of the payment application is exacted from all the data streams according to a payment protocol of the pay application.

Optionally, the extracted load characteristic comprises an identifying characteristic field and its location in the application layer load.

Specifically, the characteristic field comprises name of payment application, edition information, and field identifier and transaction type.

Optionally, before the identifying step, a step of exacting encrypted data stream characteristic is included, wherein the encrypted data stream characteristic is exacted from the data streams that cannot extract payment application load characteristic.

Specifically, the extracted encrypted data stream characteristic comprises a number of uplink packets, a number of downlink packets, uplink packet length mean value, downlink packet length mean value and duration.

In any of the above described embodiment, optionally, when collecting network flow across physical machines, a bypass detector is provided at a gateway of a physical network security device which controls communication access across physical machines, so as to perform mirror capture of network flow across physical machines.

In any of the above described embodiment, optionally, when collecting the network flow across physical machines, a detection virtual machine is correspondingly provided in the same one physical machine where a plurality of virtual machines are located, wherein the detection virtual machine uses a virtual network port thereof as a mirror port of other virtual network ports, and collects the network flow across a plurality of virtual machines in this physical machine via this mirror port.

Specifically, at the network flow pre-processing step, data stream in the flow is extracted with a quintuple <source IP address, source port number, destiny IP address, destiny port number, transmission protocol> as the identifier.

In any of the above described embodiment, optionally, each virtual machine in the virtualized environment is determined according to the IP address and the virtual network port number, thus determining each said data stream which connects two different virtual machines.

According to yet another aspect of the invention, a compliance detecting method of payment applications in a virtualized environment is provided, which is used for compliance detection for PCI DSS isolation demand, comprising the following steps:

collecting network flow across physical machines and across virtual machines in a virtualized environment;

performing flow pre-processing for the network flow so as to determine each data stream which correspondingly connects two different virtual machines; and a data stream analyzing and detecting step;

wherein the data stream analyzing and detecting step comprises the following steps:

at least determining a virtual machine domain D (VM) to which one payment application corresponds according to all the data streams, and further determining a connection collection C (VMi) of other virtual machines correspondingly connected by each virtual machine VMi among M virtual machines in the virtual machine domain D (VM), wherein M is larger than or equal to 2, $1 \leq i \leq M$;

comparing the virtual machine domain D (VM) of the payment application with a predetermined virtual machine domain D' (VM) corresponding to the payment application, wherein the predetermined virtual machine domain D' (VM) is a collection of virtual machines to which the payment application corresponds in a compliance state;

if D (VM) is equal to D' (VM), determining whether the connection collection C (VMi) of each virtual machine in the virtual machine domain D (VM) is correspondingly equal to a connection collection C' (VMf) of each virtual machine $VM_f$ in the predetermined virtual machine domain D' (VM); and if it is determined "yes", a compliance state is determined, wherein f is an integer larger than or equal to 2;

if D (VM) is not equal to D' (VM), or C (VMi) is not equal to C' (VMf), determining that the current virtual machine domain D (VM) is in a non-compliance state, wherein the data stream analyzing and detecting step further comprises the following steps:

identifying the data stream according to application layer load of the data stream so as to determine whether it is payment application flow to which the payment application corresponds;

calculating the percentage of the payment application flow in all the data streams;

determining whether the percentage is smaller than or equal to a predetermined value;

if it is determined "yes", a non-compliance state is determined; and it is determined "no", a compliance state is determined.

The compliance detecting method of payment applications according to the invention is adapted to be used in a virtual machine environment so as to conveniently determine whether it complies with isolation demand of PCI DSS and guarantee the security of payment applications in the virtual environment.

BRIEF DESCRIPTION OF THE DRAWINGS

The above and other objects and advantages of the invention will become more complete and clear from the above detailed description with reference to the accompanying drawings, wherein identical or similar elements are denoted by identical reference signs.

DETAILED DESCRIPTION OF THE INVENTION

Some of a plurality of embodiments of the invention will be described below with the purpose of providing a basic understanding of the invention rather than identifying key elements or crucial elements of the invention or limiting the scope of protection. It can be easily understood that according to the technical solution of the invention, those skilled in the art can propose other implementations that can be replaced with each other without departing from the true spirit of the invention. Therefore, the following specific embodiments and drawings are merely exemplary description of the technical solutions of the invention, and should not be considered as the entirety of the invention or as limiting or restricting the technical solutions of the invention.

In the invention, the virtualized environment is a network environment which uses virtual technology and comprises virtual machines, and it runs payment applications. Generally, a cloud environment which runs payment applications is a private cloud environment, i.e., the virtualized environment defined in the invention. The following description is given with a private cloud environment as an example.

Herein, "the virtual machine" and "the physical machine" are relative concepts, wherein one or more virtual machines that can be connected to each other can exist in one "physical machine".

Figure 1:
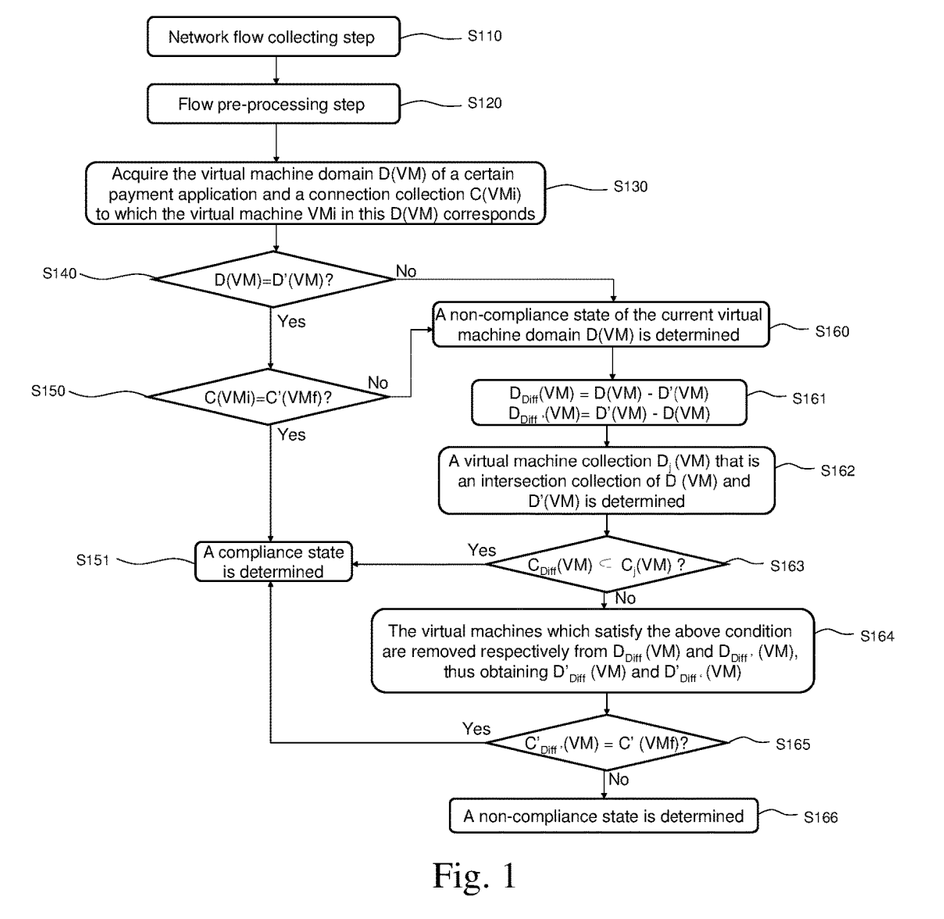
FIG. 1 is a schematic flowchart of the compliance detecting method according to an embodiment of the invention.

FIG. 1 is a schematic flowchart of the compliance detecting method according to an embodiment of the invention. A detailed description is given below with reference to FIG. 1.

Firstly, a scene for detecting is discussed by way of example.

The private cloud environment is divided using VLAN according to the differences between payment applications, wherein one VLAN is one secure domain which can be used to process one kind of payment application. Access activities across VLANs will be controlled, wherein control points are located at gateways of individual VLANs.

Meanwhile, in the virtualized environment, one kind of payment application may be distributed at a plurality of virtual machines in one physical machine, or may be distributed at a plurality of physical machines, and possibly, there can be a complicated situation in which a plurality of physical machines carry a plurality of applications and each application is distributed at a plurality of physical machines; the specific distribution of payment applications in the virtualized environment is not limiting. For communication across virtual machines on different physical machines, a physical network security device having a high performance can be used to realize access control strategy; for communication across virtual machines on the same physical machine, access control is realized by a virtual network security device. When deploying virtual machines, optionally, the gateway of the virtual machine is directed directly to the physical network security device by bridging the network interfaces of the virtual machine (or in a way similar to bridging).

Typically, the transaction types supported by payment applications are limited, and the way and flowchart for processing payment information stream is certain. Transaction messages are generated automatically according to transaction information input by users, and the format of message follows certain business specifications and is carried on a certain transaction protocol.

Next, as shown in FIG. 1, a network flow collecting step S110 is executed.

Specifically, when collecting network flow, a bypass detector can be provided at a gateway of a physical network security device such as switchboard, router or the like, so as to perform mirror capture of network flow across physical machines by the bypass detector, thus collecting network flow across physical machines. For collecting network flow across a plurality of virtual machines on the same one physical machine, one virtual machine (e.g., detecting virtual machine) is provided at this physical machine. By using a mirroring function of the virtual network security device, a virtual network port of the detecting virtual machine is used as a mirror port of virtual network ports of other virtual machines, and the mirror port is used to collect network flow across virtual machines on the same one physical machine.

Next, as shown in FIG. 1, a network flow pre-processing step S120 is executed.

In this embodiment, the following sub-steps are used so as to execute flow pre-processing.

(1) data stream in the collected network flow is extracted with a quintuple <source IP address, source port number, destiny IP address, destiny port number, transmission protocol> as the identifier; in this way, each data stream is identified uniquely;

(2) in a virtualized environment, each virtual machine can be determined according to IP address and virtual network port number so that the virtual machines connected at two ends of each data stream are marked; the virtual machines are identified by virtual machine number which has a global uniqueness in the virtualized environment; herein, the virtual machine i (assuming that number i is an integer which increases gradually from 1) is represented by VMi. In this way, the data stream which connects two different virtual machines can be determined.

Next, as shown in FIG. 1, step S130 is executed: acquiring the virtual machine domain D(VM) of a certain payment application and a connection collection C(VMi) to which the virtual machines VMi in this D(VM) correspond.

In this embodiment, the virtual machine domain of a certain payment application can be obtained by analyzing the data stream. Specifically, in case that the virtual machines connected at two ends of the data stream are determined, if there is data stream between the virtual machines VMi and VMj, there is a connection between them, which is represented by connection (VMi, VMj); L is used to represent the collection of all the connections (i.e., a collection of all the virtual machine connections existing in the virtual machine domain of a certain payment application). The collections of virtual machines that have emerged in L are counted, that is, the virtual machine domain of the payment application, which is represented by D(VM). In this embodiment, D(VM) comprises M different virtual machines, and all the virtual machines contained therein are not necessarily located in the same one physical machine, and there can also be a virtual collection across physical machines. The connection collections of other (M−1) virtual machines correspondingly connecting to each virtual machine in D(VM) are further counted. For example, C(VMi) represents a collection of all the virtual machines to which the virtual machine VMi connects, wherein M is an integer larger than or equal to 2, $1 \leq i \leq M$.

Next, as shown in FIG. 1, step S140 is executed: determining whether D(VM) is equal to D'(VM).

In this embodiment, D'(VM) is a predetermined virtual machine domain, which can be a collection of the virtual machines to which the payment application corresponds in a compliance state, and which can be designed and determined in advance in the system. At step S130, D(VM) is obtained by making a statistics and analysis on the data stream. By using a similar method, the predetermined virtual machine domain D'(VM) can be also obtained in advance. A comparison is made between the current virtual machine domain D(VM) and the predetermined virtual machine domain D'(VM).

Next, as shown in FIG. 1, if it is determined "yes", the method proceeds to step S150 to determine whether a connection collection C (VMi) of each virtual machine VMi in the virtual machine domain D(VM) is correspondingly equal to a connection collection C' (VMf) of each virtual machine VMi in the predetermined virtual machine domain D(VM); that is, whether C (VMi) is equal to C' (VMf).

If C (VMi)=C'(VMf), it means that the current virtual machine domain is consistent with the virtual machine domain in the compliance state, thus determining that the current payment application virtual machine domain is in a compliance state; that is, at step S151, the compliance state is determined.

If D (VM)≠D' (VM), or if C (VMi)≠C' (VMf) (that is, if there is at least one virtual machine in the current virtual machine domain D(VM) whose current connection collection C (VMi) is not equal to the connection collection C' (VMf) thereof in the compliance state), the method proceeds to step S160 so that a non-compliance state of the current virtual machine domain D(VM) is determined.

Next, as shown in FIG. 1, in case that the non-compliance state is determined, in order to more precisely determine whether the current non-compliance state is accurate, a further determination is made; that is, the method proceeds to step S161.

At step S161, a collection $D_{Diff}(VM)$ of virtual machines in D (VM) that cannot be correspondingly found in D'(VM), and a collection $D_{Diff'}(VM)$ of virtual machines in D' (VM) that cannot be correspondingly found in D(VM) are determined respectively; that is, the following formulas (1) and (2) are used for calculation.

$$D_{Diff}(VM) = D(VM) - D'(VM) \quad (1)$$

$$D_{Diff'}(VM) = D'(VM) - D(VM) \quad (2)$$

Next, as shown in FIG. 1, the method proceeds to step S162, in which a virtual machine collection $D_j(VM)$ that is an intersection collection of D (VM) and D'(VM) is determined, that is, $Dj(VM) = D(VM) \cap D'(VM)$.

Next, as shown in FIG. 1, the method proceeds to step S163, in which it is determined that whether the connection collection $C_{Diff}(VM)$ of each virtual machine in $D_{Diff}(VM)$ and $D_{Diff'}(VM)$ (i.e., a connection collection of one virtual machine in $D_{Diff}(VM)$ connecting with other virtual machines in $D_{Diff'}(VM)$) can find a corresponding equal connection collection in the connection collection $C_j(VM)$ of each virtual machine in $D_j(VM)$ (i.e., a connection collection of one virtual machine in $D_{Diff}(VM)$ connecting with other virtual machines in $D_{Diff'}(VM)$), that is, to determine $C_{Diff}(VM) \subset C_j(VM)$.

If it is determined "yes", it can be concluded that at some processing nodes of the payment information stream, some original virtual machines are closed or some virtual machines are newly opened according to loads, and that there is some deviation in the previous determination. Therefore, the non-compliance state before update is a compliance state; otherwise, step S163 is executed.

Next, as shown in FIG. 1, at step S164, the virtual machines which satisfy the above condition are removed from $D_{Diff}(VM)$ and $D_{Diff'}(VM)$ respectively, thus obtaining $D'_{Diff}(VM)$ and $D'_{Diff'}(VM)$.

Next, as shown in FIG. 1, the method proceeds to step S165, in which it is determined that whether the connection collection $C'_{Diff}(VM)$ of the virtual machines in $D_{Diff}(VM)$ and $D'_{Diff'}(VM)$ is correspondingly equal to the connection collection C' (VMf) of D' (VM) in the compliance state.

If it is determined "yes", it can be concluded that for some processing node in the payment information stream, due to the reason of system break down, the virtual machines that are originally in the compliance state are replaced by newly opened virtual machines in the current state, and the non-compliance state before update is a compliance state; otherwise, step S166 is executed, and a non-compliance state is determined. Of course, at step S165, a situation in which more than two virtual machines break down simultaneously is not taken into consideration.

Hitherto, the determination of compliance detection of this embodiment is completed. Obviously, this detecting method is not only suitable for a virtualized environment, but also can be used to accurately detect current virtual machine domain of payment applications in a private cloud environment as well as its connection, thus determining whether the payment applications comply with isolation mechanism demands of PCI DSS. In this way, the administrator or compliance assessor can be facilitated in timely knowing about whether the payment applications currently comply with security isolation demands of standard PCI DSS in the industry, thus guaranteeing security of payment applications and better protecting data of cardholder.

Figure 2:
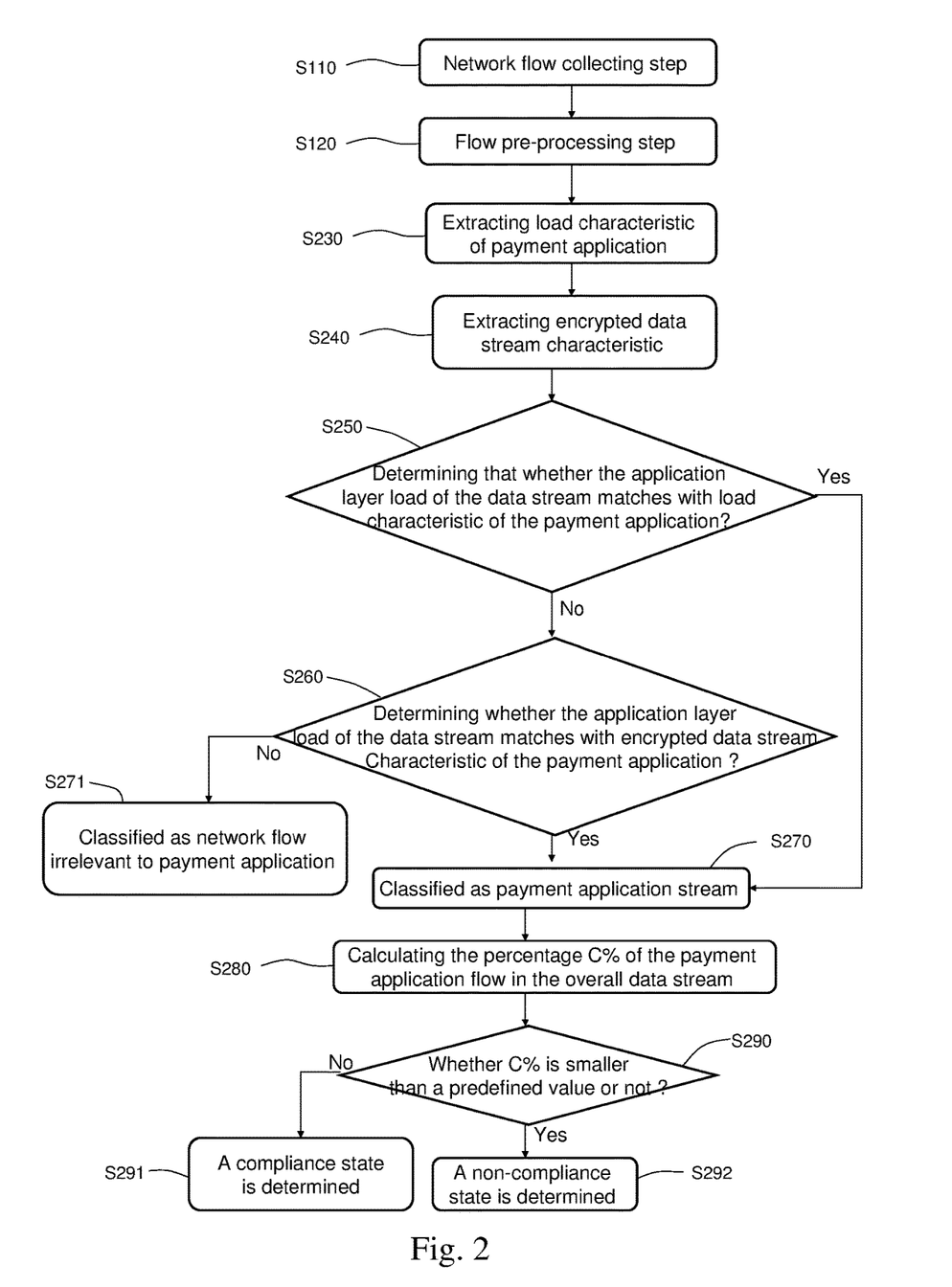
FIG. 2 is a schematic flowchart of the compliance detecting method according to another embodiment of the invention.

FIG. 2 is a schematic flowchart of the compliance detecting method according to another embodiment of the invention. In the detecting method of this embodiment, the detecting scene, step S110 and step S120 are the same as those in the embodiment shown in FIG. 1, and are thus not discussed repeatedly.

As shown in FIG. 2, at step S230, load characteristic of payment application is extracted.

In this embodiment, the payment protocol used by payment application may have a procedure in which only sensitive information filed related to application layer loads is encrypted. Specifically, the Wireshark tool can be used to analyze flow data packet so as to extract application layer load characteristic. During the process of extracting and analyzing, whether there is identifying characteristic field in the application layer load of data packet as well as information on its location in the application layer load are paid particular attention to. For example, the identifying characteristic field comprises and is not limited to name of payment application, edition information, field identifier (e.g., "Account Number", "PIN") and transaction type (e.g., "Balance Enquiry", "Purchase"), etc.

Next, as shown FIG. 2, step S240 is executed, in which encrypted data stream characteristic is extracted.

In this embodiment, when processing the payment information stream, there are some procedures in which the entire application layer loads are encrypted so as to better protect data transmission. The encrypted data steam will not exhibit regular characteristics at the content level of application layer load, and recognition can not be made via the application layer load characteristic. That is, load characteristic of payment application cannot be extracted at step S230. For this part of data stream, the steam characteristic can be extracted by statistics. The selected stream characteristic comprises and is not limited to a number of uplink packets, a number of downlink packets, uplink packet length mean value, downlink packet length mean value and duration.

It is understood that the above order of executing steps S230 and S240 is not limited to the above embodiments. In other embodiments, the two steps can be executed simultaneously, and it is also possible that step S240 is executed firstly and step S230 is then executed.

Next, as shown FIG. 2, step S250 is executed, in which it is determined that whether the application layer load of the data stream matches with load characteristic of the payment application. If it is determined "yes", it is determined that the data stream is payment application flow to which the payment application corresponds, and the method proceeds to step S270; otherwise, the method proceeds to step S260.

Next, as shown in FIG. 2, step S260 is executed, in which it is determined whether the application layer load of the data stream matches with encrypted data stream characteristic of the payment application; if it is determined "yes", it is determined that the data stream is payment application flow to which the payment application corresponds and the method proceeds to step S270; otherwise, the method proceeds to step 271, and the data stream is classified as network flow irrelevant to payment application.

In this way, the data stream is recognized according to application layer load of the data stream, and data streams that are not payment application flow are excluded.

Next, as shown in FIG. 2, step S280 is executed, in which the percentage C % of the payment application flow in the overall data stream is calculated.

Next, as shown in FIG. 2, step S290 is executed so as to determine whether C % is smaller than a predefined value or not. The predefined value can be set in advance in the system and reflects a proportion of network flow that the data stream can contain in a compliance state and is irrelevant to payment application. If it is determined "yes", the method proceeds to step S291 and a compliance state is determined, that is, it complies with a compliance detection for PCI DSS isolation demand; otherwise, the method proceeds to step S292 and a non-compliance state is determined.

Hitherto, the compliance detecting method of this embodiment is substantially completed. Through the purity of network flow of virtual machines, the method can determine whether a payment application in a virtualized environment complies with PCI DSS isolation mechanism demand or not, and can assist an administrator or compliance assessor in timely knowing about whether the payment applications currently comply with security isolation demands of standard PCI DSS in the industry, thus guaranteeing security of payment applications and better protecting data of cardholder.

Figure 3:
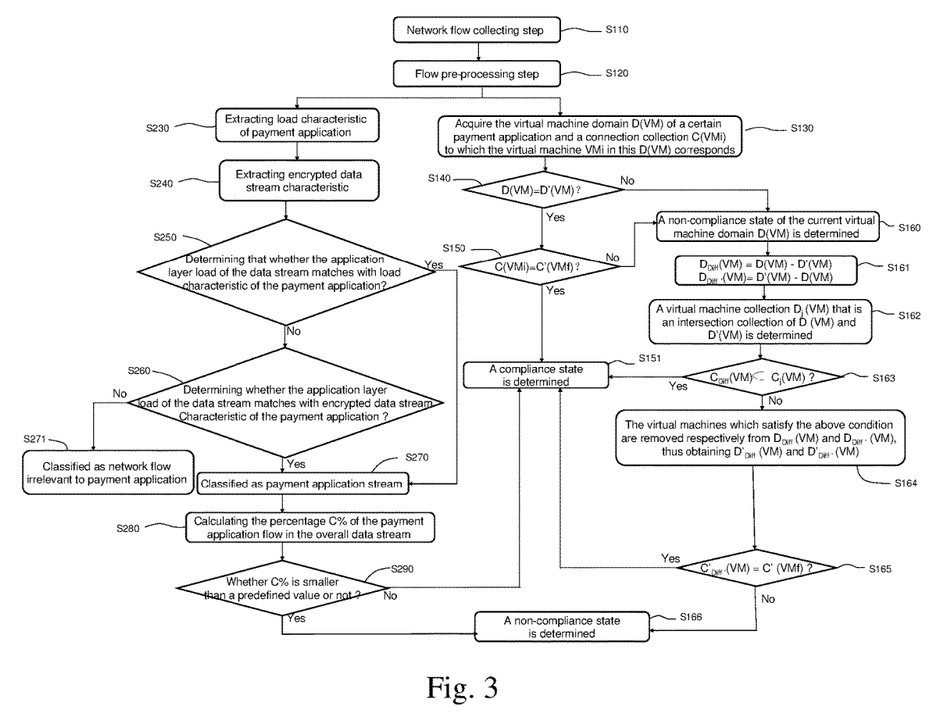
FIG. 3 is a schematic flowchart of the compliance detecting method according to yet another embodiment of the invention.

FIG. 3 is a schematic flowchart of the compliance detecting method according to yet another embodiment of the invention. In this embodiment, the two compliance detecting methods of the embodiments shown in FIGS. 1 and 2 are employed simultaneously. The step S291 in FIG. 2 is incorporated into step S151, and the step S292 is incorporated into step S166, wherein steps S230 to S290 are correspondingly identical to steps S230 to S290 shown in FIG. 2, steps S130 to S160 are correspondingly identical to steps S130 to S160 shown in FIG. 1, and these steps are thus not discussed repeatedly.

Therefore, the detecting method of the embodiment shown in FIG. 3 can conduct detecting in the two aspects of virtual machine domain and/or flow purity, and the compliance detection is more accurate and reliable relatively, wherein, a mono detection in terms of flow purity and a mono detection in terms of virtual machine domain.

The above embodiments mainly describe compliance detecting methods of payment applications in a virtualized environment according to the invention. While only some of the embodiments of the invention have been described, those skilled in the art will understand that the invention can be carried out in many other forms without departing from the spirit and scope thereof. Therefore, the illustrated examples and embodiments should be interpreted as schematic rather than limiting, and the invention can cover various modifications and replacements without departing form the spirit and scope of the invention defined by the appended claims.

The invention claimed is:

1. A compliance detecting method of payment applications in a virtualized environment, which is used for compliance detection for PCI DSS isolation demand, wherein comprising the following steps:

collecting network flows across physical machines and across virtual machines in a virtualized environment;

performing flow pre-processing for the network flow so as to determine each data stream that correspondingly connects two different virtual machines;

at least determining a virtual machine domain D (VM) to which one payment application corresponds according to all the data streams, and further determining a connection collection C (VMi) of other virtual machines correspondingly connected by each virtual machine VMi among M virtual machines in the virtual machine domain D (VM), wherein M is larger than or equal to 2, $1 \leq i \leq M$;

comparing the virtual machine domain D (VM) of the payment application with a predetermined virtual machine domain D' (VM) corresponding to the payment application, wherein the predetermined virtual machine domain D' (VM) is a collection of virtual machines to which the payment application corresponds in a compliance state;

if D (VM) is equal to D' (VM), determining whether the connection collection C (VMi) of each virtual machine in the virtual machine domain D (VM) is correspondingly equal to a connection collection C' (VMf) of each virtual machine VMf in the predetermined virtual machine domain D' (VM); and if it is determined "yes", a compliance state is determined, wherein f is an integer larger than or equal to 2;

if D (VM) is not equal to D' (VM), or C (VMi) is not equal to C' (VMf), determining that the current virtual machine domain D (VM) is in a non-compliance state.

2. The compliance detecting method according to claim 1, wherein, after the non-compliance state being determined, further determining a collection DDiff (VM) of virtual machines in D (VM) that cannot be correspondingly found in D'(VM), and determining a collection DDiff' (VM) of virtual machines in D' (VM) that cannot be correspondingly found in D(VM);

determining a collection of virtual machines Dj (VM) that is an intersection collection of D (VM) and D' (VM);

determining whether a connection collection CDiff (VM) of each virtual machine in DDiff (VM) and DDiff' (VM) can find a corresponding equal connection collection in the connection collection Cj (VM) of each virtual machine in Dj (VM);

if it is determined "yes", an update is made to determine the non-compliance state as the compliance state.

3. The compliance detecting method according to claim 2, wherein, if the connection collection CDiff (VM) of each virtual machine in DDiff (VM) and DDiff'(VM) can not all find a corresponding equal connection collection in the connection collection Cj (VM) of each virtual machine in Dj (VM), removing a virtual machine, that can find a corresponding equal connection collection in the connection collection Cj (VM) of each virtual machine in Dj (VM), from DDiff (VM) thus obtaining D'Diff (VM); and removing a virtual machine, that can find a corresponding equal connection collection in the connection collection Cj (VM) of each virtual machine in Dj (VM), from DDiff'(VM), thus obtaining D'Diff' (VM);

determining whether the connection collection of each virtual machine in DDiff' (VM) and D'Diff' (VM) can find a corresponding equal connection collection of virtual machines in the predetermined virtual machine domain D' (VM);

if it is determined "yes", an update is made to determine the non-compliance state as the compliance state; otherwise, the non-compliance state is maintained.

4. The compliance detecting method according to claim 1, wherein, when collecting network flow across physical machines, a bypass detector is provided at a gateway of a physical network security device which controls communication access across physical machines, so as to perform mirror capture of the network flow across physical machines.

5. The compliance detecting method according to claim 1 or 4, wherein, when collecting the network flow across physical machines, a detection virtual machine is correspondingly provided in the same one physical machine where a plurality of virtual machines are located, wherein the detection virtual machine uses a virtual network port thereof as a mirror port of other virtual network ports, and collects the network flow across a plurality of virtual machines in this physical machine via this mirror port.

6. The compliance detecting method according to claim 5, wherein, at the flow pre-processing step, data stream in the network flow is extracted with a quintuple <source IP address, source port number, destiny IP address, destiny port number, transmission protocol> as the identifier.

7. The compliance detecting method according to claim 6, wherein, each virtual machine in the virtualized environment is determined according to the IP address and the virtual network port number, thus determining each said data stream which connects two different virtual machines.

8. A compliance detecting method of payment applications in a virtualized environment, which is used for compliance detection for PCI DSS isolation demand, wherein comprising the following steps:

collecting network flow across physical machines and across virtual machines in a virtualized environment;

performing flow pre-processing for the network flow so as to determine each data stream which correspondingly connects two different virtual machines;

identifying the data stream according to application layer load of the data stream so as to determine whether it is payment application flow to which the payment application corresponds;

calculating the percentage of the payment application flow in all the data streams;

determining whether the percentage is smaller than or equal to a predetermined value;

if it is determined "yes", a non-compliance state is determined; and if it is determined "no", a compliance state is determined.

9. The compliance detecting method according to claim 8, wherein, if the application layer load of the data stream matches with load characteristic of the payment application, it is determined that the data stream is payment application flow to which the payment application corresponds.

10. The compliance detecting method according to claim 9, wherein, if the application layer load of the data stream does not match with load characteristic of the payment application, it is determined whether the data stream matches with encrypted data stream characteristic of the payment application; if it is determined "yes", it is determined that the data stream is payment application flow to which the payment application corresponds.

11. The compliance detecting method according to claim 10, wherein, before the identifying step, a step of exacting encrypted data stream characteristic is included, wherein the encrypted data stream characteristic is exacted from the data streams that cannot extract payment application load characteristic.

12. The compliance detecting method according to claim 11, wherein, the extracted encrypted data stream characteristic comprises a number of uplink packets, a number of downlink packets, uplink packet length mean value, downlink packet length mean value and duration.

13. The compliance detecting method according to claim 9, wherein, before the identifying step, a step of exacting the load characteristic of the payment application is included, wherein the load characteristic is exacted from the data streams according to a payment protocol of the pay application.

14. The compliance detecting method according to claim 13, wherein, the extracted load characteristic comprises an identifying characteristic field and its location in the application layer load.

15. The compliance detecting method according to claim 14, wherein, the characteristic field comprises name of payment application, edition information, field identifier and transaction type.

16. The compliance detecting method according to claim 8, wherein, when collecting network flow across physical machines, a bypass detector is provided at a gateway of a physical network security device which controls communication access across physical machines, so as to perform mirror capture of network flow across physical machines.

17. The compliance detecting method according to claim 8 or 16, wherein, when collecting the network flow across physical machines, a detection virtual machine is correspondingly provided in the same one physical machine where a plurality of virtual machines are located, wherein the detection virtual machine uses a virtual network port thereof as a mirror port of other virtual network ports, and collects the network flow across a plurality of virtual machines in this physical machine via this mirror port.

18. The compliance detecting method according to claim 17, wherein, at the flow pre-processing step, data stream in the network flow is extracted with a quintuple <source IP address, source port number, destiny IP address, destiny port number, transmission protocol> as the identifier.

19. The compliance detecting method according to claim 18, wherein, each virtual machine in the virtualized environment is determined according to the IP address and the virtual network port number, thus determining each said data stream which connects two different virtual machines.

20. A compliance detecting method of payment applications in a virtualized environment, which is used for compliance detection for PCI DSS isolation demand, wherein comprising the following steps:
  collecting network flow across physical machines and across virtual machines in a virtualized environment;
  performing flow pre-processing for the network flow so as to determine each data stream which correspondingly connects two different virtual machines; and
  a data stream analyzing and detecting step;
  wherein the data stream analyzing and detecting step comprises the following steps:
  at least determining a virtual machine domain D (VM) to which one payment application corresponds according to all the data streams, and further determining a connection collection C (VMi) of other virtual machines correspondingly connected by each virtual machine VMi among M virtual machines in the virtual machine domain D (VM), wherein M is larger than or equal to 2, $1 \le i \le M$;
  comparing the virtual machine domain D (VM) of the payment application with a predetermined virtual machine domain D' (VM) corresponding to the payment application, wherein the predetermined virtual machine domain D' (VM) is a collection of virtual machines to which the payment application corresponds in a compliance state;
  if D (VM) is equal to D' (VM), determining whether the connection collection C (VMi) of each virtual machine in the virtual machine domain D (VM) is correspondingly equal to a connection collection C' (VMf) of each virtual machine VMf in the predetermined virtual machine domain D' (VM); and if it is determined "yes", a compliance state is determined, wherein f is an integer larger than or equal to 2;
  if D (VM) is not equal to D' (VM), or C (VMi) is not equal to C' (VMf), determining that the current virtual machine domain D (VM) is in a non-compliance state,
  wherein the data stream analyzing and detecting step further comprises the following steps:
  identifying the data stream according to application layer load of the data stream so as to determine whether it is payment application flow to which the payment application corresponds;
  calculating the percentage of the payment application flow in all the data streams;
  determining whether the percentage is smaller than or equal to a predetermined value;
  if it is determined "yes", a non-compliance state is determined; and it is determined "no", a compliance state is determined.

* * * * *